United States Patent [19]

DeLuca et al.

[11] 4,267,449

[45] May 12, 1981

[54] TESTING THE INTEGRITY OF LIQUID CONTAINING HERMETICALLY SEALED CONTAINERS BY THE USE OF RADIOACTIVE MARKERS

[75] Inventors: Patrick P. DeLuca; L. David Butler, both of Lexington, Ky.

[73] Assignee: The University of Kentucky Research Foundation, Lexington, Ky.

[21] Appl. No.: 66,390

[22] Filed: Aug. 14, 1979

[51] Int. Cl.³ .................... G01T 1/161; G09K 3/00
[52] U.S. Cl. ................................ 250/303; 250/302
[58] Field of Search .............................. 250/303, 302

[56] References Cited

U.S. PATENT DOCUMENTS

| 3,135,865 | 6/1964 | Reed et al. | 250/303 |
| 3,247,382 | 4/1966 | Schneider et al. | 250/303 |
| 3,649,096 | 3/1972 | Clark et al. | 250/303 |

OTHER PUBLICATIONS

"Study . . . Detecting Leaks–Ampuls" by Artz et al., Jour. of Pharmaceutical Sciences, vol. 50, No. 3, pp. 258-262.

Primary Examiner—Harold A. Dixon
Attorney, Agent, or Firm—Birch, Stewart, Kolasch and Birch

[57] ABSTRACT

A method for detecting leaky ampules filled with a liquid such as a parenteral solution. The ampules to be tested are immersed in a solution containing a short-lived radionuclide, and a pressure differential is imposed between the solution containing the radionuclide and the parenteral solution or other liquid contained in the ampules. The ampules are then removed from solution, decontaminated to remove any solution adhering to the outer surface and pores thereof, dried, and finally examined for electromagnetic radiation, preferably gamma radiation, emanating from the interior of the ampules which would indicate a leaky condition thereof.

17 Claims, 4 Drawing Figures

TESTING THE INTEGRITY OF LIQUID CONTAINING HERMETICALLY SEALED CONTAINERS BY THE USE OF RADIOACTIVE MARKERS

The present invention relates generally to processes for detecting leaks in hermetically sealed containers such as ampules, and more particularly to improvements in processes for detecting such leaks using a radioactive liquid which is forced into leaky containers. Accordingly, the general objects of the invention are to provide new and improved processes of such character.

BACKGROUND OF THE INVENTION

Quality control is a major concern to manufacturers of sterile parenteral products. The exclusion of particulate and microbial contamination during all phases of production and storage of sterile parenterals is of paramount importance if product quality is to be guaranteed. An added packaging requirement is the capability of the container in preventing the entry of contamination during storage. According to the USP Product Defect Reporting System, numerous incidents of contamination in parenteral products have been traced to faulty seals.

Sterile products are available in many dosage forms, and are packaged principally in single or multiple dose containers. Multiple dose containers use a rubber stopper as a seal so that the product is resealed following withdrawal of doses. In order to further assure sterility, products packaged in multiple dose containers generally include a preservative to guard against accidental contamination. Single dose ampules or stoppered vials generally do not contain a preservative. Therefore, a specific requirement for glass ampules is that they must be completely sealed to avoid the entry of outside contamination.

Sealing an ampule after it is filled with solution consists of heating the neck of the ampule until soft, then rotating the ampule and pulling the tip simultaneously for pull seals. For tip sealing, the open end is flamed and sealed while the ampule is continually rotated. The simplicity of the procedure, however, is deceptive and imperfections in the seal can arise in several ways. The duration of heating may be insufficient to cause complete closure, or it may be excessive, thereby causing fragile bubbles to form which may break during or after heating. The ampule may become too hot during sealing and fracture when cooled, or the speed of rotation may be slow or erratic, causing uneven heating of the ampule and subsequent cracking during cooling. The possibility of contamination of the product through minute cracks or holes in the wall of an ampule makes the detection of such imperfections imperative if sterility and stability are to be assured.

The most popular test for this purpose is called the "leaker test". Its merits and shortcomings have been discussed by several authors (D. E. McVean, P. A. Tuerck, G. L. Christenson, and J. T. Carstensen, "Inadequacies in Leakage Test Procedures for Flame-sealed Ampules", *J. Pharm. Sci.*, 61, (10) 1609–1611 (1972) and W. J. Artz, W. T. Gloor, Jr., and D. R. Reese, "Study of Various Methods for Detecting Leaks in Hermetically Sealed Ampules", *J. Pharm. Sci.*, 50(3) 258–262 (1961)). At least three variations on this procedure exist (D.P.S.C. Standards for the Manufacture and Packaging of Drugs, Pharmaceuticals, and Biological Products, Defense Personnel Support Center, Philadelphia, Pa., September 1968, Appendix II, p. 52). If they are terminally sterilized, the hot ampules are immediately submerged in a room temperature dye bath, rinsed, dried, and visually inspected for color against a white background. A partial vacuum is created in the ampules as the hot liquid contracts, which draws dye solution inside through any flaws in the seal. If the product, on the other hand, is aseptically prepared (cold sterilization), the sealed ampules are inverted and floated in an indicator dye solution in a vessel which can be evacuated or pressurized. Vacuum or pressure is applied for about one minute, then released. The ampules are rinsed, dried, and inspected as in the hot method. In any of these methods, a change of color in the ampule's contents indicates a "leaker" which is subsequently rejected from the lot.

Two major problems are associated with the leaker test. First, the colors of most commonly used indicator dyes are dependent on the pH, and second, visual detection of color depends on the intensity of the color.

The first problem can be overcome if an indicating dye is carefully chosen for each product which will definitely produce color in that product. The second problem, though, is much more difficult to solve. The amount of dye which will enter an ampule is unpredictable unless the size of the aperture constituting the imperfection in the seal is known. Many leakers may go undetected by an inspector because the concentration of dye in the ampule is insufficient to produce a color of discernible intensity.

Choosing an appropriate dye for each product to be tested is bothersome, and it is risky to assume that a negative result from a subjective test such as color detection by visual inspection conclusively indicates an intact seal. Therefore, it seems appropriate to develop a more universal, more sensitive, and more objective procedure for detecting faulty seals in ampules (leakers).

THE PRIOR ART

No U.S. patent is known which relates specifically to the use of radioactive liquids in testing ampules, filled with a parenteral solution or other liquid, for leaks.

The most pertinent U.S. patent known to the inventors with respect to the subject matter of this invention is U.S. Pat. No. 3,135,865 to Reed et al, issued June 2, 1964. This patent teaches testing a hollow sealed object, such as a bellows, for leaks. The hollow sealed object is immersed in a solution containing a radioactive material, removed from said solution and decontaminated, if desired, and then tested for radioactivity emanating from the interior of said hollow sealed object indicating a leaky object.

U.S. Pat. No. 3,621,252 teaches testing articles for cracks by immersion thereof in radioactive fluids, followed by testing of the articles for radioactivity; note col. 1, lines 20–27.

SUMMARY OF THE INVENTION

By means of the present invention, a radioactive liquid, e.g., a solution containing a radionuclide, preferably technetium 99 m, is caused to penetrate into an ampule, already filled with a parenteral solution or other liquid, if the ampule is leaky. This particular isotope is well suited for use in the present invention because technetium 99 m (sodium pertechnetate) is a low energy gamma emitter (142.7 kiloelectron volts) with a six hour half-life. The damage to tissue by technetium 99 m is negligible and the safety of this radionuclide is further evidenced by its widespread diagnostic use. Sodium pertechnetate is freely water soluble, and can be removed from glass surfaces easily using distilled water or normal saline solution. If the dye in the leaker test is replaced by or mixed with technetium 99 m, it should be relatively easy to determine the activity within leakers objectively, accurately and rapidly. Due to the short half-life of the radionuclide, disposal of the rinse solutions is not a problem. Moreover, of the radioactive liquids, it is readily available. Its inertness is a particularly desirable quality from the standpoint of non-destructive testing.

The general procedure for detecting leaky ampules includes the following steps:

(1) placing the ampules to be inspected in a testing chamber;

(2) causing said ampules to be completely immersed in said testing chamber in a solution containing a radionuclide, preferably technetium 99 m;

(3) applying vacuum or pressure or a sequential combination of the two to the top of the radionuclide containing solution, then sharply releasing said vacuum or pressure;

(4) removing said ampules from the solution containing the radionuclide such as technetium 99 m and decontaminating them to remove any of said solution which could be present on the outer surfaces of said ampules or in the pores thereof;

(5) drying said ampules; and (6) examining said ampules for electromagnetic radiation, preferably gamma radiation, emanating from the interior thereof with a suitable radiation detector to determine whether said ampules leaked during immersion in the solution containing the radionuclide.

It has been pointed out above that the solution for testing the ampules may contain not only a radionuclide such as technetium 99 m, but also may contain a dye which has been previously used in the prior art to test for leaky ampules. This combination may be desirable from a production standpoint even though, as more fully documented below, the use of a dye alone does not result in an entirely reliable test for leaky ampules. However, the color comparison test employed to detect leaky ampules when a dye is present in the testing solution is much simpler than obtaining an accurate radiation count. If, after immersion in a solution containing both a radionuclide such as technetium 99 m and a dye, the ampules are first subjected to a color comparison test, elimination of leaky ampules found by this test reduces the number of radiation counts that must be carried out.

DETAILED DESCRIPTION OF THE INVENTION

The Ampules

Figure 1:
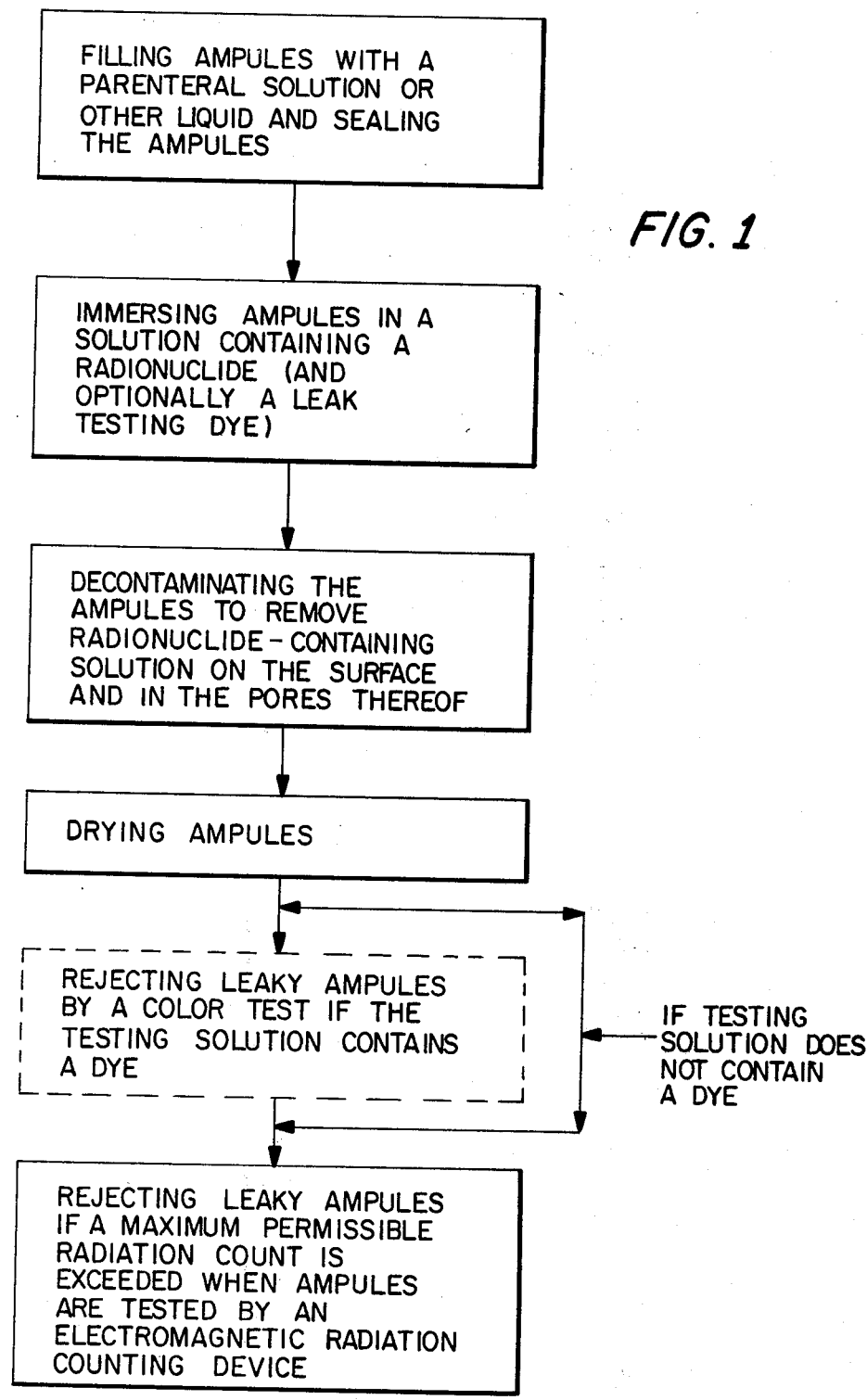
FIG. 1 shows a flow diagram for the purpose of filling and sealing ampules, and then testing them for leakage.

Transparent glass ampules are the preferred form of the hermetically sealed container which is tested for leaks by the procedure described in this specification. However, any sealed container of one-piece construction may be tested for leaks by the procedure described in this specification. The container may be made of glass, plastic, metal, ceramic, etc., and may be colored, colorless, transparent or opaque.

The Ampule Filling

Parenteral solutions are the preferred form of the liquid filling for the hermetically sealed ampules. Examples of parenteral solutions which are packaged in glass ampules include sodium warfarin (Coumadin ®), furosemide (Lasix ®), oxytocin (Pitocin ®), and isoproterenol hydrochloride. Other types of solutions which may be packaged in ampules include inhalants, diagnostic solutions and solutions for test kits. Any liquid which requires a container with an intact seal to guarantee its integrity may be employed as the liquid filling which may be packaged in ampules.

The Radioactive Marker

Technetium 99 m is the preferred form of the radioactive marker employed in this invention for leaker detection. Other radionuclides which can be used for leaker detection are set forth below.

| RADIONUCLIDES WHICH CAN BE USED FOR LEAKER DETECTION | | |
|---|---|---|
| Nuclide | $t_{\frac{1}{2}}$ | Gamma Energy |
| $^{57}CoCl_2$ | 270 days | 0.122 MeV |
| $^{58}CoCl_2$ | 71 days | 0.81 MeV |
| $^{65}ZnCl_2$ | 244 days | 1.11 MeV |
| $^{85}SrCl_2$ | 65 days | 0.51 MeV |
| $^{86}RbCl_2$ | 19 days | 1.08 MeV |
| $^{59}FeCl_3$ | 46 days | 1.1 MeV | for small number of ampules,
$^{68}$Ga generator $t_{\frac{1}{2}}$ (daughter) = 68 min, $t_{\frac{1}{2}}$ (parent $^{68}$Ge) = 280 days
$^{188}$Re generator $t_{\frac{1}{2}}$ (daughter) = 17 hr, $t_{\frac{1}{2}}$ (parent $^{188}$W) = 69 days
Xenon-133, $t_{\frac{1}{2}}$ = 5 days, 0.081 MeV It is quite feasible to use inorganic water-soluble sulfate, phosphate, or nitrate salts in place of the chlorides shown in the above Table.

Filling and Sealing the Ampules

This can be effected by means of any of the procedures well known to those skilled in the art. One form of commercially available apparatus for effecting the filling and sealing of the ampules is the Cozzoli Ampule Sealer, available from the Cozzoli Machine Co., of Plainfield, N.J.

In further illustration of these steps reference is made to the following patents:

U.S. Pat. No. 1,397,631, Goodchild, Nov. 22, 1921;
U.S. Pat. No. 1,517,780, Goodchild, Dec. 2, 1924; U.S. Pat. No. 2,877,611, Anrep, Mar. 17, 1959.

Leak Detection

In accordance with the preferred practice of the present invention, the ampule to be tested or checked for leaks is immersed in a solution which contains a radionuclide such as technetium 99 m, and optionally may also contain a dye well known in the art for the detection of leaky ampules, e.g., bromthymol blue. As a consequence of this immersion, some of the solution can penetrate into the void or chamber within the ampule if it has any openings in the wall thereof which extend from said void or chamber entirely through the ampule wall. The penetration may be due, for example, to an existing or imposed pressure differential, kinetic energy of the molecules in the solution, or capillary action. Any portion of the solution which has penetrated into said void or chamber is then detected or measured from outside the ampule by radiation techniques. Such detection will therefore be indicative of the existence of a leak in the ampule.

With respect to the imposed pressure differential referred to just above, either pressure or vacuum (or a sequential combination of both) can be applied to the solution containing the radionuclide, although vacuum is preferred. Artz et al, referred to above, have shown that the vacuum method is more effective in detecting leakers.

The following is a possible simple explanation of how the application of a vacuum to the top of the solution containing the radionuclide causes said solution to enter a leaky ampule immersed therein, rather than the reverse as might be expected. When vacuum (500–550 mm Hg) is applied to the top of the testing solution, the pressure of this solution on the ampules contained therein is reduced. This pressure drop does indeed draw solution and/or air out of the leaking ampules, thereby creating a partial vacuum in said ampule. Now, the vacuum on the top of the solution is released sharply. The vacuum in the ampule must also be released in order to reestablish equilibrium pressure, and the only way possible is for the ampule to draw surrounding solution (containing the radionuclide) in until the pressure inside the ampule is the same as that of the solution outside the ampule.

Artz et al point out that the most efficient means for forcing liquid into the ampule is to release the vacuum every ten minutes for three times. However, this method could be varied at the discretion of the operator, as can the amount of time allowed for re-equilibration of the pressure, to optimize the conditions of an individual testing system.

The preferred practice of the invention contemplates submitting the exterior surfaces of the ampules to certain decontamination procedures following the immersion in the testing solution, and before the ampules are submitted to radiation analysis. Such procedures, however, may not be, and generally are not, completely effective in removing all surface and porous contaminants from the ampules. It will be apparent that the radiation from these surface contaminants will be detected or counted along with the radiations emitted by the solution which has penetrated into the void or chamber of the ampule. Such surface and porous radiations provide, therefore, a potential source of error in the final test determination, and, accordingly, to obtain leakage determinations having a relatively high degree of accuracy, the effect of these latter radiations must be compensated for. One procedure for doing this is to employ blanks, i.e., a certain number of ampules are run through the same procedure as the other ampules to be tested, but in the immersion portion of the test no pressure differential is applied, i.e., between the solution containing the radionuclide such as technetium 99 m and the liquid contents of the ampule. The average count from the blanks is subtracted from the radiation count of the fully tested ampules.

Because of the length of time required to assay all of the ampules for radioactive content, and the fact that the half-life of a radionuclide such as technetium 99 m is rather short (6 hours), there is a further possible source of error with respect to making radioactive counts that must be compensated for. That is, the raw counts obtained from the ampules have to be corrected for radionuclide (technetium 99 m) decay. One procedure for doing this is to adjust all counts, using the time at the beginning of the inspection of any lot of ampules received from the drying step as zero time. A correction is then made for the raw count for any particular ampule, depending upon how much time has elapsed from zero time to the time for the inspection of said ampule.

In order to determine the effectiveness of the decontamination precedures and to ascertain the point beyond which further decontamination will have little or no effect, samples of the decontamination solution may be subjected to periodic radiation counts. Repeated cleansing operations which yield successive, substantially equal counts will be indicative of the ineffectiveness of further decontamination.

Following the decontamination procedure the ampules are subjected to a drying step, which may be carried out by means of the conventional procedures well known to those skilled in the art. Thereafter, the ampules are subjected to inspection by any radiation counter considered to be suitable for the purpose.

The radiation counting can be done, for example, by the use of a hand-held radiation counter. The operator would scan each ampule as it is presented to him, and note those ampules giving a radiation count above a certain maximum, indicating that such an ampule had leaked during the immersion test and therefore was to be discarded. Instead of such a procedure, it is possible to automate the inspection function in a manner well known to those skilled in the art. That is, the ampules could be placed on a conveyor belt passing under a radiation counter. The radiation counter could be arranged to signal an operator when an ampule exceeded the maximum count value permitted. Alternatively, an ejector could be arranged to automatically eject such ampules.

APPARATUS FOR CARRYING OUT THE FOREGOING METHODS

Figure 2:
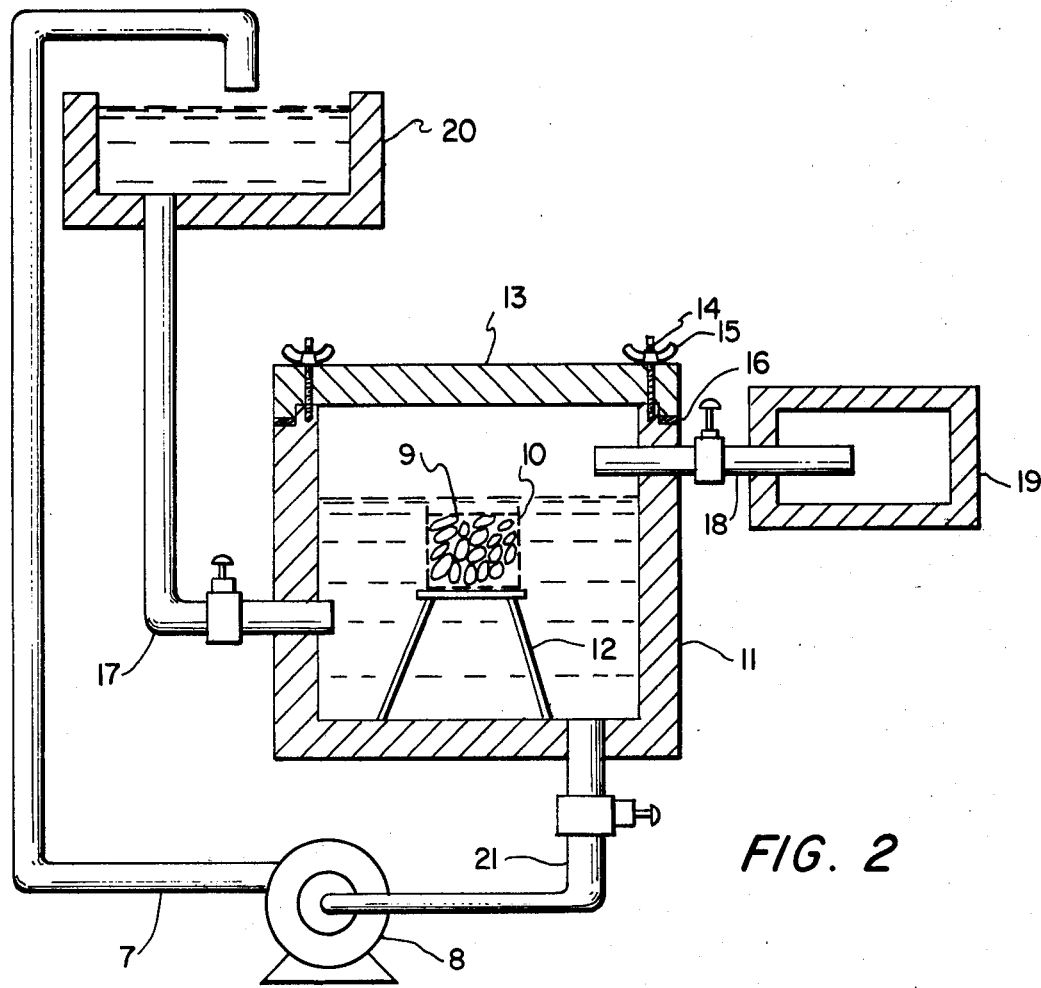
FIG. 2 shows one form of an apparatus that may be employed to carry out the immersion test for leaking ampules.
Figure 3:
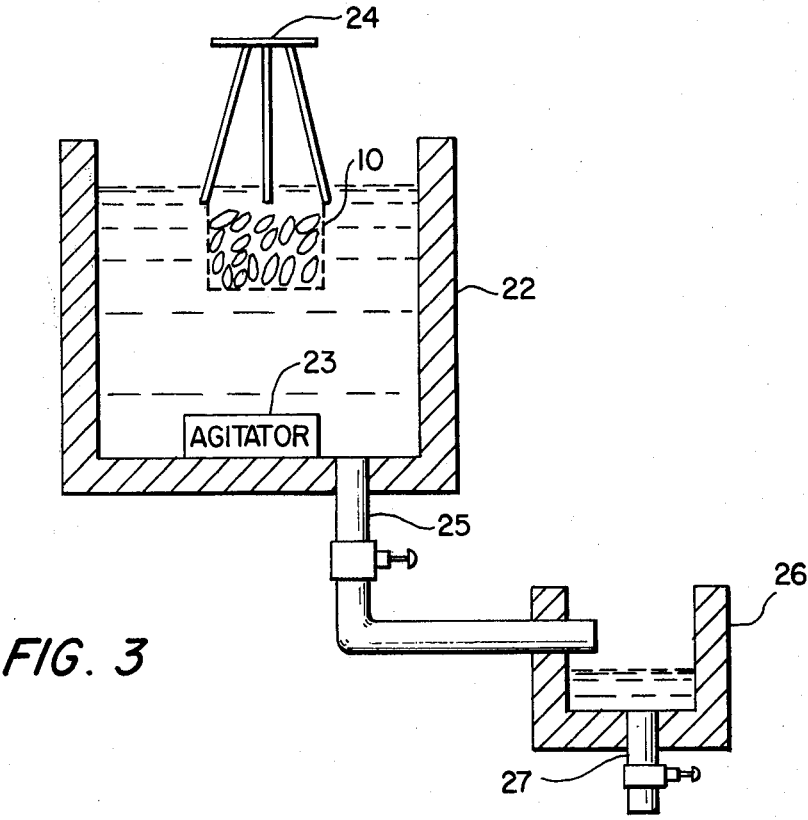
FIG. 3 shows one form of an apparatus that may be employed to carry out the decontamination of the ampules after they have been immersed in the solution containing the radionuclide such as technetium 99 m.
Figure 4:
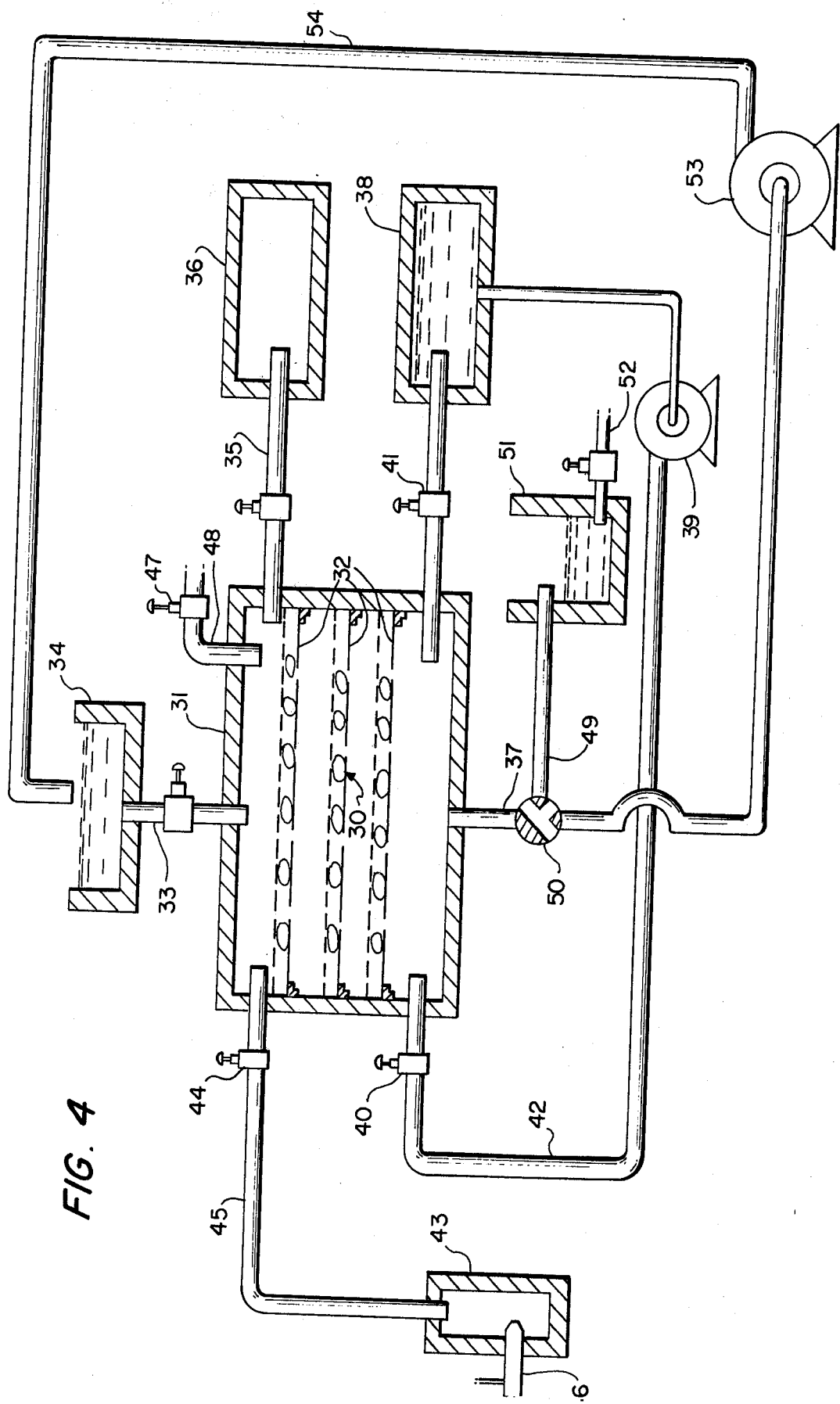
FIG. 4 shows an alternative form of apparatus in which all of the functions of immersing the ampules in the radioactive liquid, decontaminating said ampules, and then drying said ampules can be effected while they are present in the same vessel or chamber.

Apparatus for carrying out the foregoing preferred practice of the invention is diagrammatically illustrated in FIGS. 2-4 of the drawings.

As shown in FIG. 2, the solution containing the radionuclide such as technetium 99 m, in which the wire basket 10 having perforated cover 9 and containing ampules to be tested is immersed, is contained within a vessel 11. Said wire basket preferably rests upon a support 12 so that the entire surface of the ampules to be inspected will be exposed to said solution. It is, as was indicated, desirable to establish a pressure differential between the solution containing the radionuclide such as technetium 99 m and the interior liquid contents of the ampules. To this end the vessel 11 is provided with a removable closure 13 which is releasably secured to the vessel 11 as by fastening means 14, 15. A gasket 16 is preferably disposed between the closure and the vessel as shown. Moreover, the vessel is shown to include a valved inlet 17 to provide for the introduction of the solution containing the radionuclide such as technetium 99 m from the tank 20 into the vessel. The vessel 11 is additionally provided with a valved conduit 18 in communication with the interior thereof and also with a vacuum (or pressure) source 19. While the wire basket 10 is immersed in the radionuclide containing solution in said vessel 11, vacuum may be applied to the top of said solution as many times as may be found desirable. After the wire basket 10 has been immersed in the radionuclide solution for a sufficient time, the vessel 11 may be drained via valved conduit 21, and the solution recycled via pump 8 and line 7 back to tank 20. The basket thereafter is removed.

Decontamination of the exterior surfaces of the ampules present in the wire basket 10 is preferably carried out, as shown in FIG. 3, by repeatedly immersing said basket in a suitable decontamination bath contained in vessel 22. This decontamination bath may, if found desirable, be agitated by sonic or ultrasonic vibrations, jets, or mechanical means generally indicated at 23. Hot or cold decontamination baths may be employed. Wire basket 10 is suspended from a carrier 24 or the like to permit such repeated immersing thereof. The vessel 22 can be drained via valved conduit 25, and the decontaminating liquid sent to holding tank 26. It is checked for radioactivity, and can be discharged via valved line 27.

No particular means for drying the ampules is shown for use with the apparatus of FIGS. 2 and 3. However, such drying can be carried out, e.g., by the use of a hot gas jet produced in any well known manner.

In the alternative, all of the immersion, decontamination, and drying procedures can be carried out in a single piece of apparatus as shown in FIG. 4.

The ampules 30 are placed in the chamber 31 through any convenient opening or door (not shown), disposed in the perforated racks 32 having upper and lower perforated bounding surfaces. Chamber 31 is then sealed, and the solution containing the radionuclide such as technetium 99 m is then admitted to said chamber via valved conduit 33 from the tank 34. The level of said solution in the chamber 31 is fixed so that it is below the valved conduit 35 leading to the vacuum (or pressure) source 36, but sufficient to immerse all ampules. Thereafter, the vacuum can be applied to the top of the solution containing the radionuclide in vessel 31 as many times as may be found desirable. Valved line 37 is then opened, causing the solution to be removed from vessel 31, and recycled via pump 53 and line 54 back to tank 34.

Thereafter, the ampules 30 on the racks 32 are decontaminated by the liquid supplied through rinsing line 42 from tank 38. The liquid is recycled through the chamber or vessel 31 by the pump 39 as many times as is found to be desirable to effect decontamination to the desired extent. The valves 40 and 41 are then closed, and any liquid remaining in the vessel is removed via valved exhaust conduits 37 and 49 by opening valve 50, causing the liquid to flow to holding tank 51. After checking for radioactivity, it can be discharged via valved line 52.

Finally, hot gas generated in chamber 43 by burner 46 is supplied to the chamber 31 by opening the valve 44 in line 45. The hot gas is removed from the chamber 31 by keeping the valve 47 in line 48 open. Provision may of course be made for recycling the drying gas through chamber 31 as many times as desired (not shown).

EXAMPLES OF THE INVENTION

Example I (Employing solution containing both technetium 99 m and dye)

Materials. Saturated bromthymol blue (The Coleman & Bell Co., Norwood, Ohio) in normal saline solution;
Ammonium phosphate (dibasic) (Mallinckrodt, Inc. St. Louis, Mo.), 0.5 M in distilled water;
Sodium pertechnetate 99 m in normal saline (Squibb Minitec, E. R. Squibb & Sons, Princeton, N.J.).

Procedure. Into each of 275 glass ampules (2 ml capacity), 1.5 ml of pH 8.2 ammonium phosphate solution was filled. The ampules were sealed using a semiautomatic device (Cozzoli Ampule Sealer, Cozzoli Machine Company, Plainfield, N.J.) which melts the neck of the ampule closed. All but ten of the ampules were inverted and immersed in a vacuum dessicator containing 2850 ml of saturated bromthymol blue solution in normal saline. This solution also contained 10 millicuries of technetium 99 m which was obtained by eluting a pertechnetate 99 m generator (Squibb Minitec, E. R. Squibb & Sons, Princeton, N.J.). The dessicator was sealed, and a vacuum was applied for about 30 seconds. The vacuum was released, then reapplied for another 30 seconds. The ampules were removed from the dessicator and placed in a wire mesh basket. They were rinsed twice with normal saline solution, and twice with cold tap water, then air dried. A surfactant rinse can be used, if necessary, for decontamination.

To serve as a blank, the remaining ten ampules were subjected to the same procedure except that vacuum was not applied. Because vacuum was not applied, any activity detected in the assay of these ten ampules was assumed to be due to residual pertechnetate on the outside of the ampule. The ampules were numbered and the radioactive content determined over a 15 second period using a well counter (Picker Scintillation Well Counter, Picker X-ray Corporation, White Plains, N.Y.). The color of the solution in each ampule was also noted. Since bromthymol blue solution changes from yellow to deep blue at pH values higher than 7.6, any blue color in the otherwise colorless ammonium phosphate solution indicates a leaker.

Due to the length of time required to assay all the ampules for radioactive content and the short half-life of technetium 99 m, the raw counts obtained from the ampules had to be corrected for radionuclide decay. All counts were adjusted using the time at the beginning of the assay as zero time. Therefore, the count values reflect relative amounts of activity rather than actual activity drawn into the ampules, and the concentration of dye is directly proportional to the relative activity.

In a separate experiment to determine the minimum amount of dye solution that must enter an ampule in order to be detected visually, various amount of saturated bromthymol blue solution were added to 25 ml of 0.5 M ammonium phosphate solution. Percent transmittance was measured at 615 nm in a colorimeter (Spectronic 20, Bausch & Lomb, Inc., Rochester, N.Y.). Since visual detection of color is a subjective test, a number of people were then asked if they could detect color in the various solutions when placed in a 2 ml ampule and held before a white background.

RESULTS

Analysis of Blanks. Analysis (Hewlett-Packard STAT 1-01A program for calculating mean, standard deviation, and standard error) of the data obtained from the ten ampules not subjected to vacuum shows that 64±24 (mean±S.D.) counts resulted from residual activity adhering to the glass or retained by scratches and abrasions on the surface of the ampule. The counts for the ten ampules ranged from 17 to 100 over the 15 second counting period.

Visual Detectability of Dye. The results of the experiment to determine the minimum amount of dye solution which must enter the ampule to be detected visually are shown in Table I.

TABLE I.
DETERMINATION OF MINIMUM AMOUNT OF DYE SOLUTION NECESSARY FOR VISUAL DETECTION

| Volume of Dye Solution in the Ampule ($\mu$l per ml) | Detectable Color | % Transmittance at 615 nm |
|---|---|---|
| 16 | yes | 68 |
| 4 | yes | 91 |
| 2.8 | yes | 94 |
| 2.4 | yes | 95 |
| 2.0 | questionable | 96 |
| 1.6 | no | 97 |
| 1.2 | no | 98 |
| 0.8 | no | 99 |
| 0.4 | no | 99 |

The data in Table I indicate that above 95% transmittance of the dye solution in ammonium phosphate, color is no longer visually detectable. This corresponds to a concentration of 2.4 microliters of dye solution per milliliter of ammonium phosphate. Therefore, the minimum volume of saturated dye solution which must enter an ampule to be detected visually is approximately 3.6 microliters. Since the dessicator contained 10 mCi of activity in 2850 ml of dye solution, a visually detectable leaker would produce approximately 7000 counts.

Determination of Leakers. Table II summarizes the results of the leaker test and the determination of activity in the ampules.

TABLE II
SUMMARY OF RESULTS FROM LEAKER TEST[a]

| Description | Frequency |
|---|---|
| Ampules with detectable color | 13 (4.9%) |
| Ampules showing no color | 251 (95.1%) |
| Colorless ampules producing more than 700 counts per quarter minute | 27 (10.2%) |
| Colorless ampules producing more than 7000 counts per quarter minute | 4 (1.5%) |

[a]Table based on 264 ampules. One ampule fractured under vacuum.

Of the 264 ampules tested, 13 (4.9%) showed detectable color and were excluded from the counting procedure. Of the ampules counted, 27 produced counts above 700, and were deemed leakers. Therefore, 67.5% (27 of 40) of the leakers showed no detectable color. In addition, 4 of the ampules which produced more than 7000 counts remained colorless. The selection of a count of 700 as indicating a leaker was somewhat arbitrary but on the conservative side. This represents a value 10 fold greater than the mean value of the blank determinations (64±24) and 7 times greater than the highest blank value (100).

Example II

Commercial glass ampules containing a parenteral solution were tested for leaks in a manner similar to that described in Example I, but in a bath solution containing only the radionuclide technetium 99 m. Four of the twenty-one ampules which were tested contained filamentous strands of material ½ to 1 inch in length. Counting of radioactivity emanating from the ampules indicated the presence or absence of leaky or faulty ampules.

After testing with the Tc-99 m solution alone, the ampules deemed to be leakers were subjected to the same procedure using the dye solution alone. Of the ampules tested, those containing the visible contamination were determined to be leakers by the radioactive method, but none showed any change in color due to dye penetration in the dye method. Therefore, even though the contaminated ampules were determined to be leakers by the radioactive test of the present invention, the dye test itself failed to detect these leakers.

As shown in these experiments, technetium 99 m, a safe, short-lived, gamma emitter, functions as a sensitive indicator for detecting faulty seals in ampules. In this regard, a maximum number of permissible counts can be established by experimentation to determine the point at which an ampule is considered to be unacceptable. In Example I, 10.2% of the ampules tested failed to produce a discernible color, but the contents were found to contain the radionuclide. Therefore, it is pertinent to point out that a sufficient amount of dye solution must enter the ampule in order to produce intensity of color which can be detected visually. On the other hand, it is clear that the radioactive test of the invention is much more sensitive than the dye method alone, as can be seen in Example II.

The high incidence of leakers encountered in some of these experiments by either the dye test (4.9%) or the detection of radioactivity in the ampules (15.1%) is seemingly greater than that which would routinely occur in actual practice. For a large scale manufacturing process an incidence of 4–5% of leakers would be considered excessive. However, this high percentage was intentional since during the sealing process extreme care was not exercised so that a significant number of faulty seals could be produced. Otherwise, a much larger number of samples would have been required.

The invention being thus described, it will be obvious that the same may be varied in many ways. Such variations are not to be regarded as a departure from the spirit and scope of the invention, and all such modifications are intended to be included within the scope of the following claims.

What is claimed is:
1. A method of testing the integrity of a plurality of one piece hermetically sealed substantially transparent ampules containing a liquid therein for leakage comprising the steps of:
 (a) immersing the ampules in an aqueous solution of a water soluble salt of a radionuclide and a dye,
 (b) applying pressure or a vacuum to the top of the solution containing the radionuclide and dye to generate a pressure differential between said solution and the liquid within the ampules at least once, and releasing said pressure or vacuum,
 (c) removing the ampules from the solution or draining the solution from the container,

(d) decontaminating the ampules by removing any solution containing the radionuclide and dye adhering to the external surface thereof, (e) color testing the ampules to detect faulty ampules into which dye has leaked, (f) rejecting said faulty ampules, if any, and subsequently (g) detecting electromagnetic radiation emanating from within the remaining ampules as a result of the presence therein of the radionuclide-containing solution which has leaked into the ampules, said radionuclide being selected from the group consisting of $^{57}Co$, $^{58}Co$, $^{65}Zn$, $^{85}Sr$, $^{86}Rb$, $^{59}Fe$, $^{68}Ga$, $^{188}Re$, $^{68}Ge$, $^{188}W$ and $^{99m}Tc$, whereby the presence or absence of electromagnetic radiation from within the ampule respectively indicates a leak in said ampule or a satisfactory sealing of said ampule.

2. A method as recited in claim 1, in which the sealed container is a hermetically sealed glass ampule.

3. A method as recited in claim 2, in which the liquid contained in the hermetically sealed glass ampule is a parenteral solution.

4. A method as recited in claim 1, in which the decontaminating of the sealed container is effected by washing or rinsing with water or a surfactant.

5. A method as recited in claim 1, in which the radionuclide is technetium 99 m in the form of sodium pertechnetate.

6. A method as recited in claim 1 in which, during the immersion of the sealed container in the solution containing the radionuclide, a pressure differential is applied to the top of said solution and released at least once.

7. A method as recited in claim 1, in which said dye is bromthymol blue.

8. A method as recited in claim 1, in which the decontaminated container is dried prior to the step of detecting electromagnetic radiation from the interior thereof.

9. A method as recited in claim 1, in which the step of detecting electromagnetic radiation from within the container comprises detecting gamma radiation therefrom.

10. A method as recited in claim 1, in which the radionuclide is technetium 99 m.

11. A method as recited in claim 1, in which the pressure differential imposed on the top of the solution containing the radionuclide is a vacuum.

12. A method as recited in claim 11, in which the vacuum is sequentially applied to the top of the solution containing the radionuclide and released at least two times.

13. A method as recited in claim 11, wherein said vacuum is released sharply.

14. A method as recited in claim 13, wherein said vacuum is at a value of 500–550 mm Hg.

15. A method as recited in claim 1, wherein said radionuclide is present as a water soluble salt.

16. A method as recited in claim 15, wherein said radionuclide is present as a water soluble inorganic salt.

17. A method as recited in claim 16, wherein said inorganic salts are selected from the group consisting of chloride, sulfate, phosphate and nitrate salts.

* * * * *